(12) United States Patent
Horowitz et al.

(10) Patent No.: US 12,141,164 B2
(45) Date of Patent: *Nov. 12, 2024

(54) CROSS-CLOUD DEPLOYMENTS

(71) Applicant: MongoDB, Inc., New York, NY (US)

(72) Inventors: Eliot Horowitz, New York, NY (US); Cory P. Mintz, Millstone Township, NJ (US); Cailin Anne Nelson, Boulder, CO (US); Viet Duc Do, Long Island City, NY (US)

(73) Assignee: MongoDB, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,408

(22) Filed: Jun. 12, 2023

(65) Prior Publication Data

US 2023/0325408 A1    Oct. 12, 2023

Related U.S. Application Data

(63) Continuation of application No. 17/342,236, filed on Jun. 8, 2021, now Pat. No. 11,727,034.

(60) Provisional application No. 63/036,205, filed on Jun. 8, 2020.

(51) Int. Cl.
*G06F 16/27* (2019.01)
*H04L 9/40* (2022.01)
*H04L 67/1097* (2022.01)

(52) U.S. Cl.
CPC ............ *G06F 16/27* (2019.01); *H04L 63/166* (2013.01); *H04L 67/1097* (2013.01)

(58) Field of Classification Search
CPC .... G06F 16/27; H04L 63/166; H04L 67/1097
USPC .......................................................... 707/610
See application file for complete search history.

(56) References Cited

U.S. PATENT DOCUMENTS

| | | | |
|---|---|---|---|
| 11,727,034 B2 * | 8/2023 | Horowitz | H04L 63/166 |
| | | | 707/610 |
| 2017/0032010 A1 | 2/2017 | Merriman | |
| 2017/0344618 A1 | 11/2017 | Horowitz et al. | |
| 2018/0359323 A1 | 12/2018 | Madden | |
| 2019/0342390 A1 | 11/2019 | Iancu et al. | |
| 2021/0326161 A1 | 10/2021 | Son et al. | |

OTHER PUBLICATIONS

Dierks, T. and Rescorla, E. "The Transport Layer Security (TLS) Protocol Version 1.2". Published Aug. 2008. Accessed Sep. 30, 2022 at <https://datatracker.ietf.org/doc/html/rfc5246>. (Year: 2008).

* cited by examiner

*Primary Examiner* — Robert W Beausoliel, Jr.
*Assistant Examiner* — Lauren Zannah Ganger
(74) *Attorney, Agent, or Firm* — Wolf, Greenfield & Sacks, P.C.

(57) ABSTRACT

Systems and methods are provided for managing a distributed database across multiple cloud provider systems. Database elements (e.g., primary, secondary, and/or read-only nodes) are distributed across multiple cloud provider systems. A provisioning component is configured to enable cross-cloud configuration options to specify the manner in which the clusters/replica set members are to be deployed across multiple cloud providers and/or geographical regions.

20 Claims, 21 Drawing Sheets

Editing Cluster0

Note: Adding nodes in regions without the primary will require an initial sync. This may take a long time for large data sets.

Review your changes to MongoDB-Products-Team > ChrisS > Cluster0

| Feature | Original | New |
|---|---|---|
| Provider | AWS | AWS, Azure, and GCP |
| Cluster Tier | 40 GB storage<br>3000 IOPS, Non-provisioned | 32 GB storage<br>120 IOPS |
| Node Configuration | 3 Electable Nodes (AWS us-east-1) | 2 Electable Nodes (AWS us-east-1)<br>2 Electable Nodes (GCP us-east1)<br>1 Electable Node (Azure eastus) |
| Pricing | $0.54/hour | $0.82/hour |

Back     Cancel   Apply Changes
1092

FIG. 10C

CROSS-CLOUD DEPLOYMENTS

RELATED APPLICATIONS

This application claims priority under 35 U.S.C. § 120 to and is a continuation of U.S. patent application Ser. No. 17/342,236, entitled "CROSS-CLOUD DEPLOYMENTS", filed Jun. 8, 2021, which claims the benefit under 35 U.S.C. § 119(e) of U.S. provisional Patent Application Ser. No. 63/036,205 entitled "CROSS-CLOUD DEPLOYMENTS," filed Jun. 8, 2020, each of which is herein incorporated by reference in their entirety.

FIELD OF THE INVENTION

The present invention relates to providing cross-cloud architectures for a distributed database system.

BACKGROUND

A number of conventional database systems exist that implement large and scalable database architectures. A variety of database architectures can be selected and tailored to specific data requirements (e.g., large volume reads, high data availability, no data loss, etc.). As the number of systems that support the various architectures increase, the complexity of the database system likewise increases. In some settings, management of the database system becomes as complex as the architecture itself, and can overwhelm administrators who need to make changes on large distributed databases. Further, the design phase of such implementations is rife with error, inconsistency, and conflict. As distributed databases integrate cloud services and virtual architectures, these problems are magnified.

SUMMARY

Various embodiments relate to creating a distributed database that crosses between cloud providers. A custom architecture is provided that maintains connections (e.g., secure) between database elements (e.g., MONGODB™ nodes (e.g., primary, secondary, arbiters, etc.)) distributed across multiple cloud providers. In some examples, architecting a distributed database across cloud providers makes the resulting system more fault tolerant, as catastrophic failures in multiple locations and over multiple cloud providers would have to occur to render the distributed database unavailable. Such a cross-cloud architecture allows for better resource utilization and allocation.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

FIGS. 1-4 are example screen captures of user interfaces for cross-region deployments, according to some embodiments of the technology described herein;

FIGS. 6A-6B are example screen captures of user interfaces for single-cloud deployments, according to some embodiments of the technology described herein;

Figure 8C:
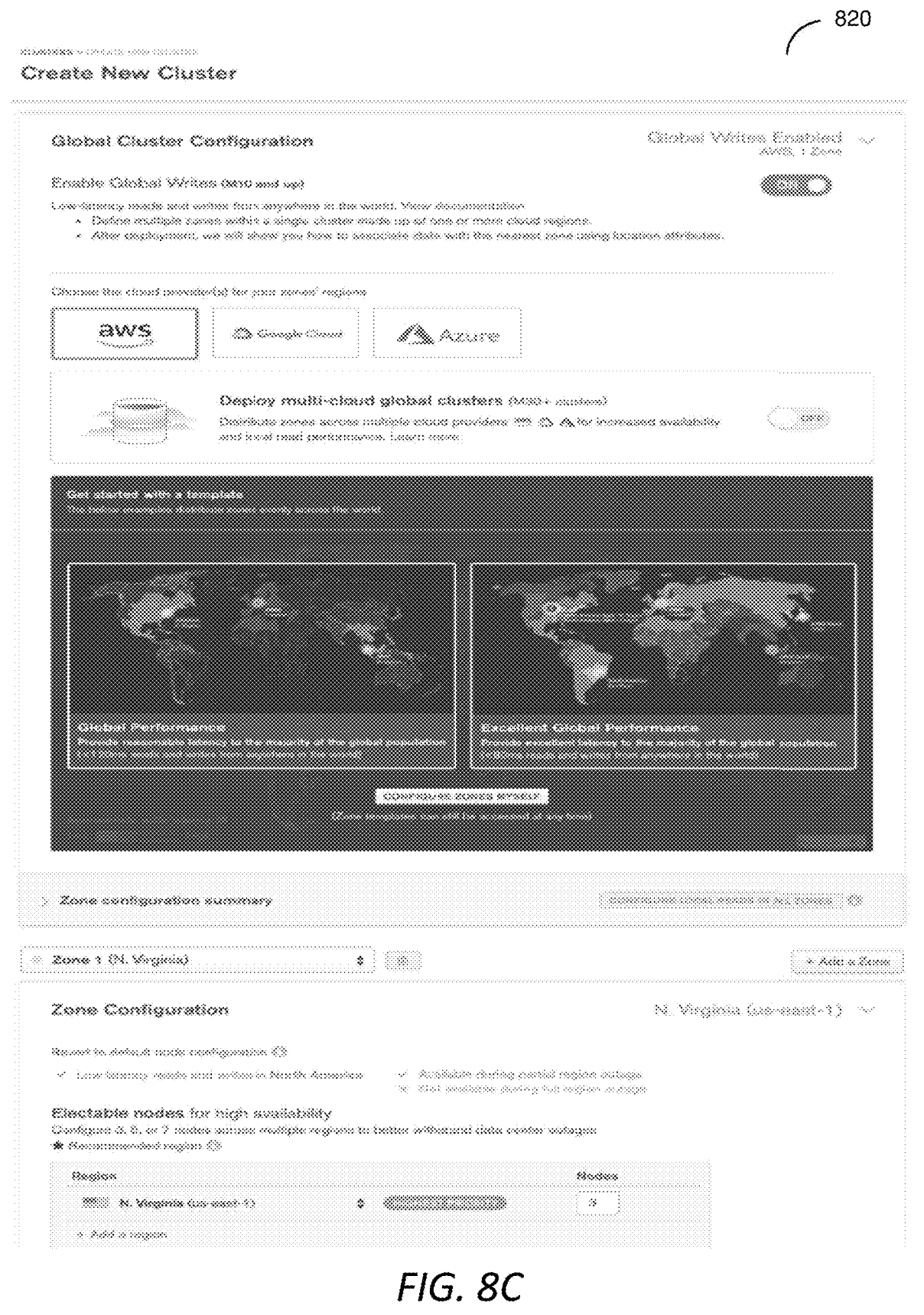

FIGS. 8A-8D are additional example screen captures of user interfaces for cross-cloud deployments, according to some embodiments of the technology described herein;

FIGS. 9A-9C are additional example screen captures of user interfaces for cross-cloud deployments, according to some embodiments of the technology described herein;

FIGS. 10A-10C are example screen captures of user interfaces enabling configuration changes for a cross-cloud deployment, according to some embodiments of the technology described herein;

DETAILED DESCRIPTION

Figure 1:
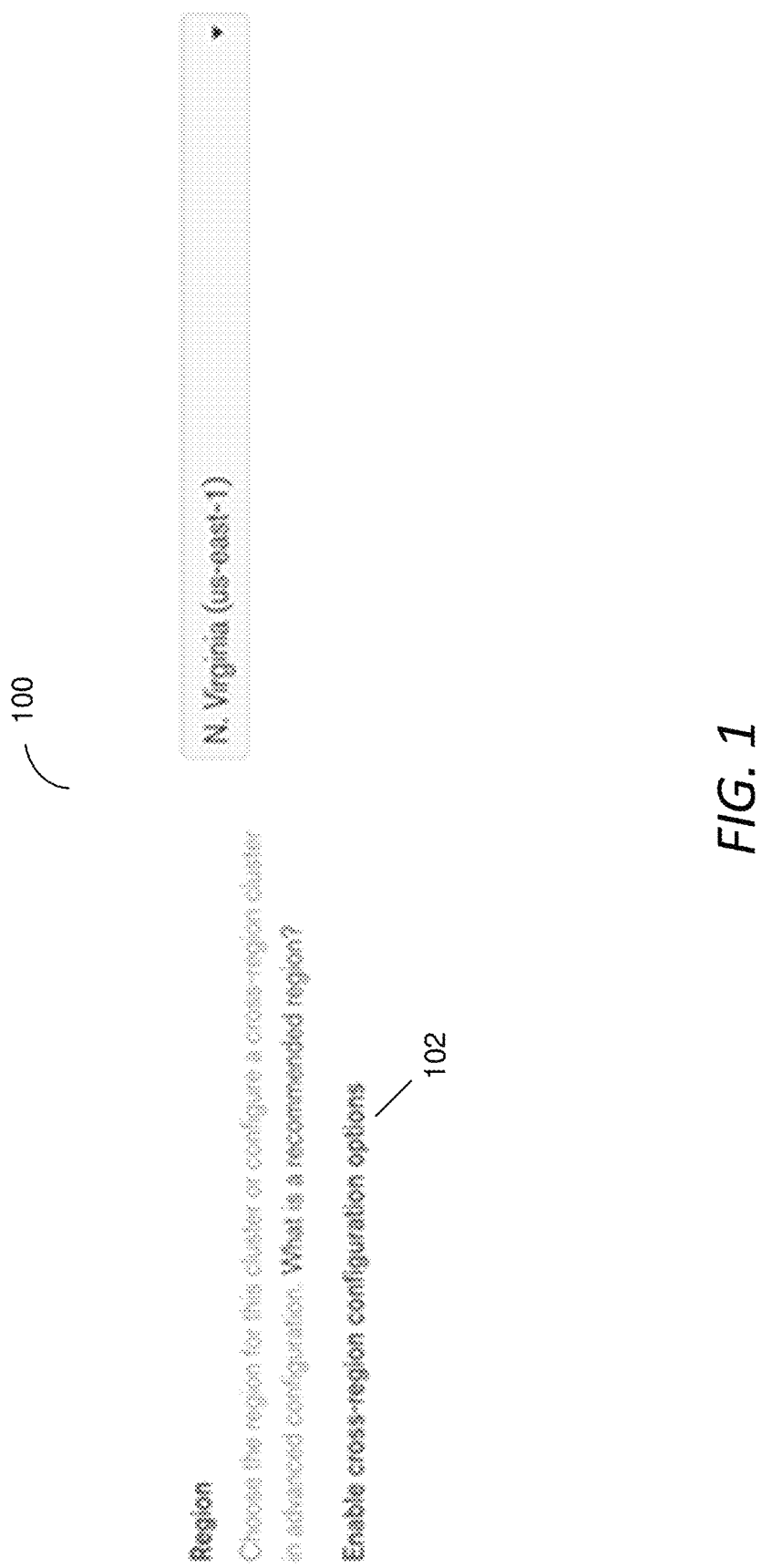

According to one aspect, various management functions of a distributed database can be facilitated and/or automated to eliminate errors in configuration, reduce downtime, and reduce the requirements for architecting solutions involving updates, healing operations, data transitions, etc. According to various embodiments, distributed databases can include automation agents, backup agents, and/or monitoring agents configured to cooperate with a central management server. In some implementations, the automation agents, backup agents, and/or monitoring agents execute on the various components of the distributed database and provide status information, utilization information, alerting, etc. to the central management server. In such implementation the central management server operates as the intelligence for identifying and/or triggering automation functions.

It is realized that enhancing the automation agents at the database level can improve over conventional approaches. For example, an intelligent agent can identify and rectify an issue on a database system, sometimes before a conventional implementation can even report the issue. Further, including proxies or caching of common problems and for example execution plans, and corresponding binaries or other applications, enables the distributed system to retrieve common solutions across multiple distributed automation agents with less latency and potentially with less bandwidth consumption. In various examples, increasing the processing capability of the distributed automation agents reduces database downtime, and reduces time of error conditions existing on the database. Patent application Ser. No. 14/969,537 entitled "SYSTEMS AND METHODS FOR AUTOMATING MANAGEMENT OF DISTRIBUTED DATABASES," filed on Dec. 15, 2015, describes examples of automation agents and example implementation and is incorporated by reference herein in its entirety.

Improving automation functions locality can also improve operational characteristics of a distributed database that spans multiple cloud providers. Typically, supporting applications, databases, web-services, etc. with cloud resources hosted by different cloud providers is rife with errors, lost connections, and increased network latency. In such a setting, local automation agents resident on respective cloud providers can handle the majority of the automation tasks without having to cross the cloud provider boundary.

According to another aspect, cross-provider architectures are enabled within a distributed database. Conventional databases provide options for implementing database architecture in the cloud. It is realized that better resource utilization and allocation can be achieved if different cloud provider systems are utilized. Currently, significant hurdles exist in creating a distributed database that crosses between cloud providers. Various embodiments provide a cross-cloud architecture that maintains connections (e.g., secure) between various database elements (e.g., MONGODB™ nodes (e.g., primary, secondary, arbiters, etc.) distributed across multiple cloud providers. In some examples, architecting a distributed database across multiple cloud providers makes the resulting system more fault tolerant, as catastrophic failures in multiple locations and over multiple cloud providers would have to occur to render the distributed database unavailable.

In some examples, the components of the distributed database are configured to maintain cross cloud connections using heartbeat signals between components. Configuration metadata can be used to identify cross-cloud channels and respective components can maintain communication to ensure a cross-cloud connection remains "live." In other embodiments, indirection layers are used to bridge connections between multiple cloud providers (e.g., a mapping layer may specify mappings (e.g., network mappings) that allow nodes of one cloud provider to communicate with nodes of another cloud provider). The indirection layer(s) may include a control plane for enabling communications between multiple cloud providers and implement the mappings that inform the nodes on how to communicate (e.g., DNS, IP addresses to use, etc.) across the cloud providers. For example, the control plane may implement mappings of MONGODB™ nodes and each node's IP addresses. The indirection layer(s) can also be configured to execute any database operations (e.g., replication, routing, etc.) transparently to the end users. In some examples, the user need not take any special action to implement or use cross-cloud database deployments, rather the indirection layer(s) provide a universal interface that allows operation, communication, etc., abstracting away the fact that the database is provisioned by multiple cloud providers. In some implementations, the indirection layer(s) may include an application driver (e.g., a MONGODB™ application driver) that transparently connects to nodes in different cloud providers to provide an abstracted experience. Various embodiments include provisioning components configured to access multiple cloud providers and instantiate resources to support cross cloud database deployments. Patent application Ser. No. 16/010,034 entitled "SYSTEMS AND METHODS FOR MANAGING A DATABASE BACK END AS A SERVICE," filed on Jun. 15, 2018, that describes examples of provisioning functions and system components, including patent application Ser. No. 15/627,613 entitled "SYSTEMS AND METHODS FOR MANAGING DISTRIBUTED DATABASE DEPLOYMENTS," filed on Jun. 20, 2017, are both incorporated by reference herein in their entirety. Also, patent application Ser. No. 15/721,176 entitled "LARGE DISTRIBUTED DATABASE CLUSTERING SYSTEMS AND METHODS, filed on Sep. 29, 2017, is incorporated by reference herein in its entirety.

According to another aspect, a distributed database may be supported by a replication architecture. For example, the well-known MONGODB™ database employs a replica set architecture to replicate database data. According to some embodiments, a replica set (also referred to herein as a database cluster) includes at least a primary node hosting a primary copy of database data, and at least two secondary nodes hosting secondary copies of the database data. Typically, writes are executed at the primary node, the operations are logged and the secondary nodes apply the logged operations to their copy of the data.

According to one aspect, as described in detail in the patent application Ser. No. 15/627,613 entitled "SYSTEMS AND METHODS FOR MANAGING DISTRIBUTED DATABASE DEPLOYMENTS," filed on Jun. 20, 2017, a cloud based system or database as a service system is configured to manage the design and creation of a distributed database in the cloud, for example, by providing a provisioning interface via which an end user may create an instantiation of the distributed database on one or more cloud providers. Example implementations of a distributed database including a shared architecture are discussed in patent application Ser. No. 15/654,590 entitled "SYSTEM AND METHOD FOR OPTIMIZING DATA MIGRATION IN A PARTITIONED DATABASE," filed on Jun. 20, 2017, which is incorporated by reference herein in its entirety. When accessing the provisioning service, the end user can via a graphical user interface or a publicly accessible API, create their database cluster by providing a name for the cluster to create and/or a version of the database application. The end user can select one or more cloud providers, one or more geographic regions for their database resources and specify an instance size. The user interface is configured to display selections for a replication factor (i.e., a number of nodes in a replica set), sharding, whether to enable automated backup services, and additional database configuration options. Once the selections are made, the system creates an instantiation of the user defined cluster on the cloud resources for a particular selected geographic region.

It is realized that enabling cross-region deployments for cloud providers allows for improved disaster recovery and fault tolerance. Enabling cross-region deployments allows replica set members (e.g., a three node replica set) associated with a particular cloud provider to be distributed across multiple geographic regions. In some embodiments, the provisioning service can be configured to enable cross-region configuration options to specify the manner in which the replica set members are to be deployed across the multiple geographic regions. In one implementation, the end user may, via the graphical user interface, make a selection to deploy replica set members in different geographical regions. For example, the three node replica set (including a primary node and two secondary nodes) may be distributed across two or three different geographic regions. Each region may include a number of independent availability zones. Availability zones consist of one or more discrete data centers, each with redundant power, networking, and connectivity, housed in separate facilities. Clusters deployed in regions with two availability zones can be split across two availability zones, where a three node replica set cluster may have two nodes deployed to one availability zone and the remaining node deployed to the other availability zone. Clusters deployed in regions with at least three availability zones can be split across three availability zones. For example, a three node replica set cluster may have one node deployed to each availability zone.

Figure 2:
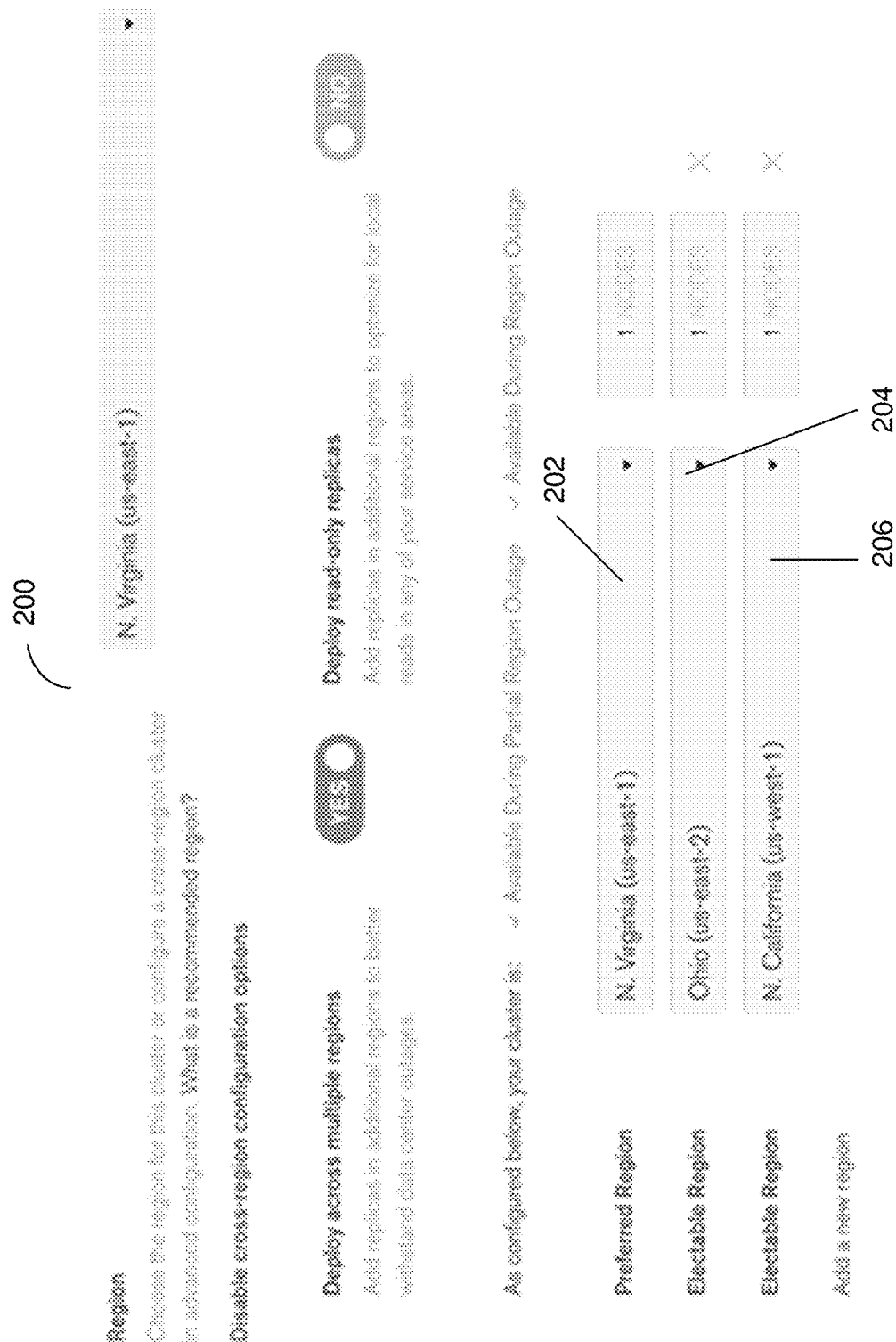

FIG. 1 shows a user interface 100 that allows a user to enable cross-region configuration options, for example, by clicking on the link "Enable cross-region configuration options" 102. As shown in FIG. 2, user interface 200 allows the user to select the nodes of the replica set to be distributed across three regions. For example, user interface 200 may include interface elements 202, 204, 206 enabling selection of us-east-1 as the preferred region (e.g., the region that contains a current primary node of the replica set) and selection of us-east-2 and us-west-1 as electable regions (e.g., regions that contain the secondary nodes of the replica set). For example, FIG. 2 illustrates that of the three nodes, a user has selected a first node to be deployed in a first region (e.g., preferred region), a second node to be deployed in a second region (e.g., one of the electable regions), and a third node to be deployed in a third region (e.g., the other electable region). Nodes in the electable regions participate in the election and automatic failover process to determine which of the secondary nodes will function as a new primary node if the current primary node fails. Such nodes may also be referred to as electable nodes. A configuration where replica set members are distributed across different geographical regions provides for improved availability guarantees even in cases of regional outages because if a node in a first geographical region fails, another node in a second geographical region may be elected to provide uninterrupted service.

Figure 3:
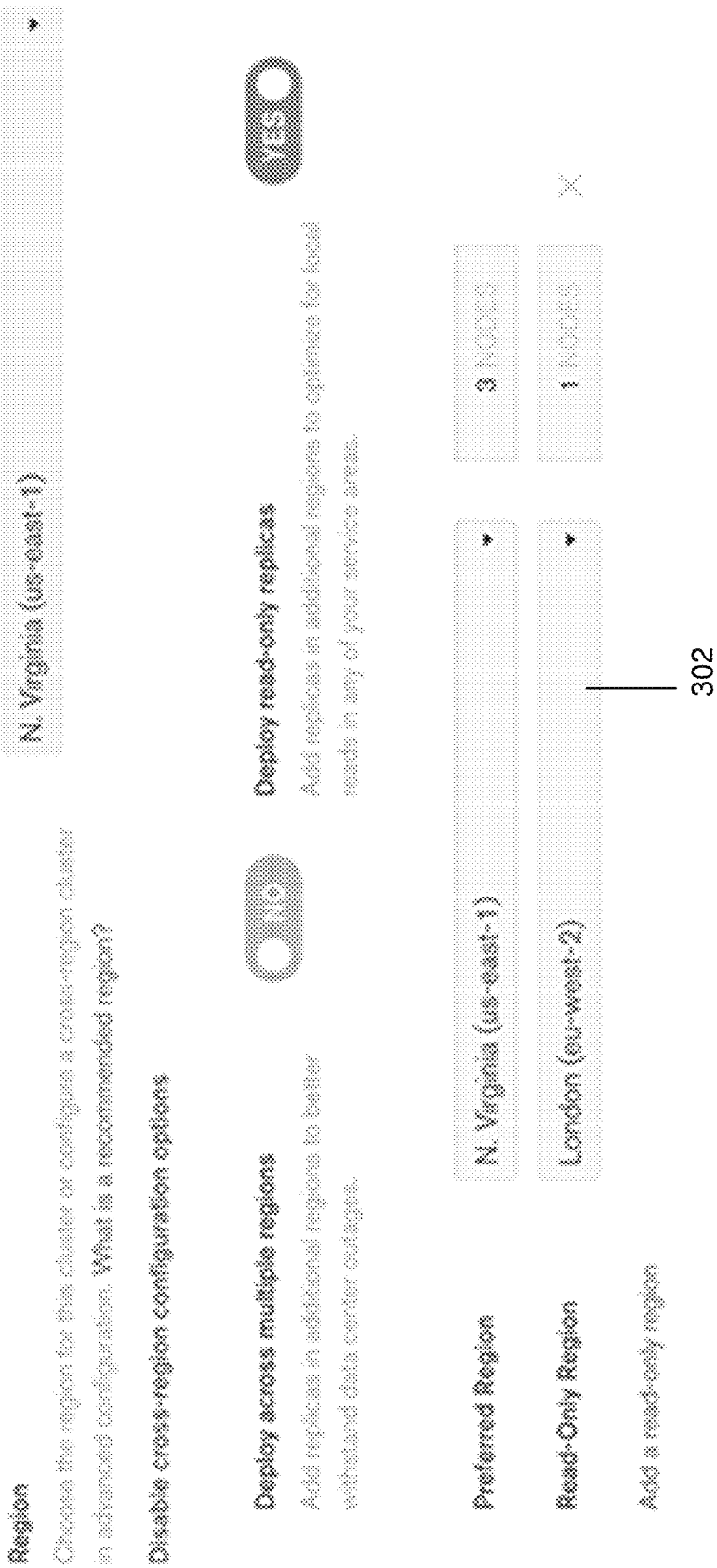
Figure 4:
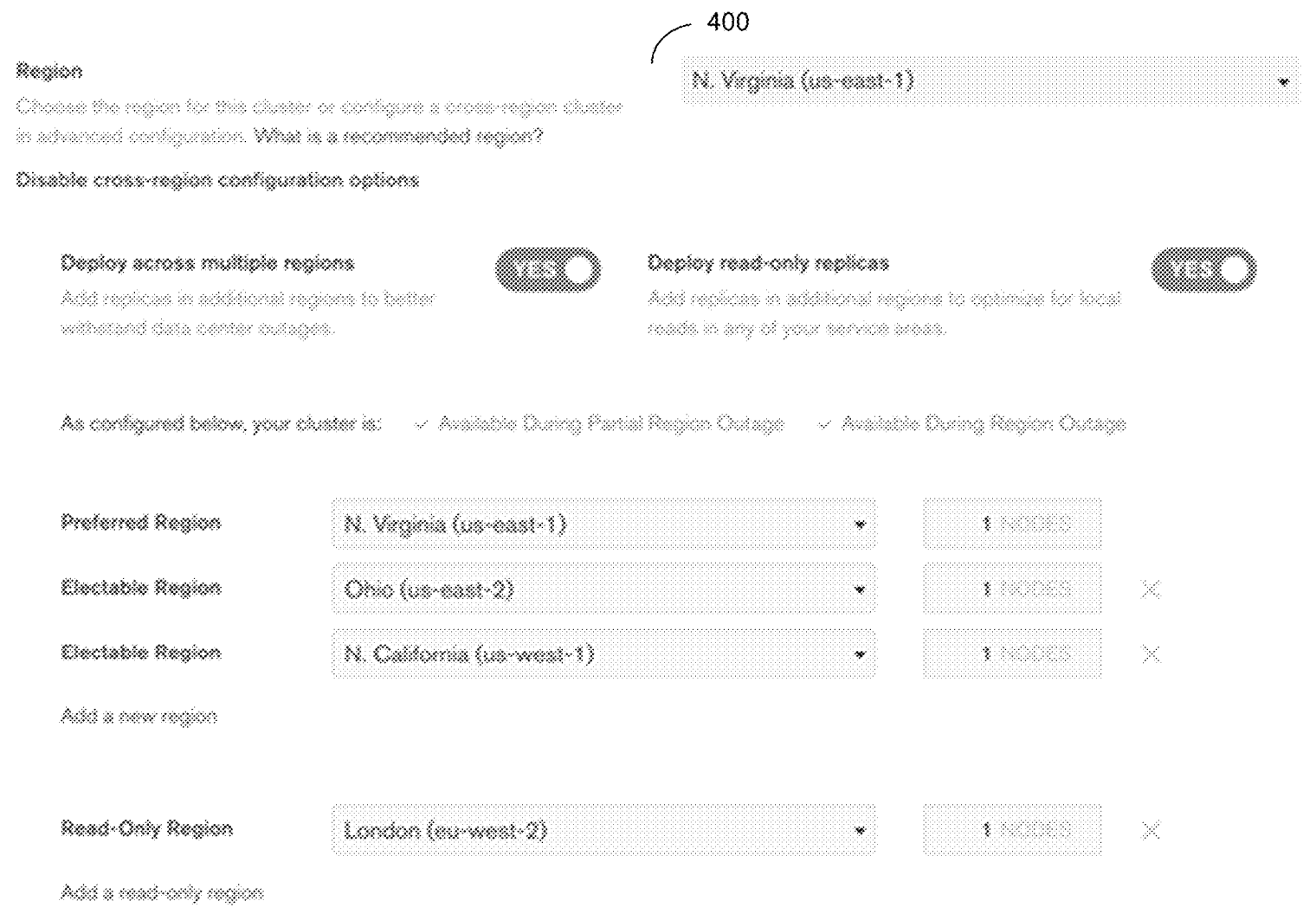

In some embodiments, the user interface 200 allows the user to select deployment options for read-only replica set members across different geographical regions for purposes of improving performance of local reads (e.g., by reducing read latency). The read-only replica set members/nodes do not participate in the election and failover process. As shown in FIG. 3, user interface 300 allows the user to add (e.g., via interface element 302) a read-only replica member to the eu-west-2 region to serve local reads. FIG. 4 shows a configuration in which the replica set members are distributed across three different geographical regions and a read-only replica set member is added to yet another geographical region.

In some implementations, each of the regions can be configured with a respective virtual private cloud (VPC) architecture, where nodes within a region can communicate with one another via internal IPs. Cross-region communication is provided via a control plane that implements network mappings that allow nodes in one region to communicate with nodes in another region.

It is also realized that enabling cross-cloud deployments further improves disaster recovery and fault tolerance (in comparison to cross-region deployments) where clusters/replica set members are distributed across multiple cloud providers (e.g., AWS, GCP, Azure) and/or geographical regions. For example, a regional outage caused by a software bug or defect in a cross-region deployment for a particular cloud provider may be easily replicated across other regions despite the regions being physically separate. Such failures can negatively impact services provided to the end users. By contrast, cross-cloud deployments provide protection against not only natural disasters but also human errors, such as, software bugs. For example, even if an entire cloud provider fails as a result of being impacted by a software bug, another cloud provider may be selected to provide services because it is highly unlikely that the other cloud provider is also affected by the same software bug. In addition, with a cross-cloud configuration, users can accrue the benefits of leveraging a mix of resources provided by multiple cloud providers (e.g., multi-cloud high availability, access to cloud-specific features, or new cloud regions) or move their data and their applications between cloud providers if they chose to.

Figure 5:
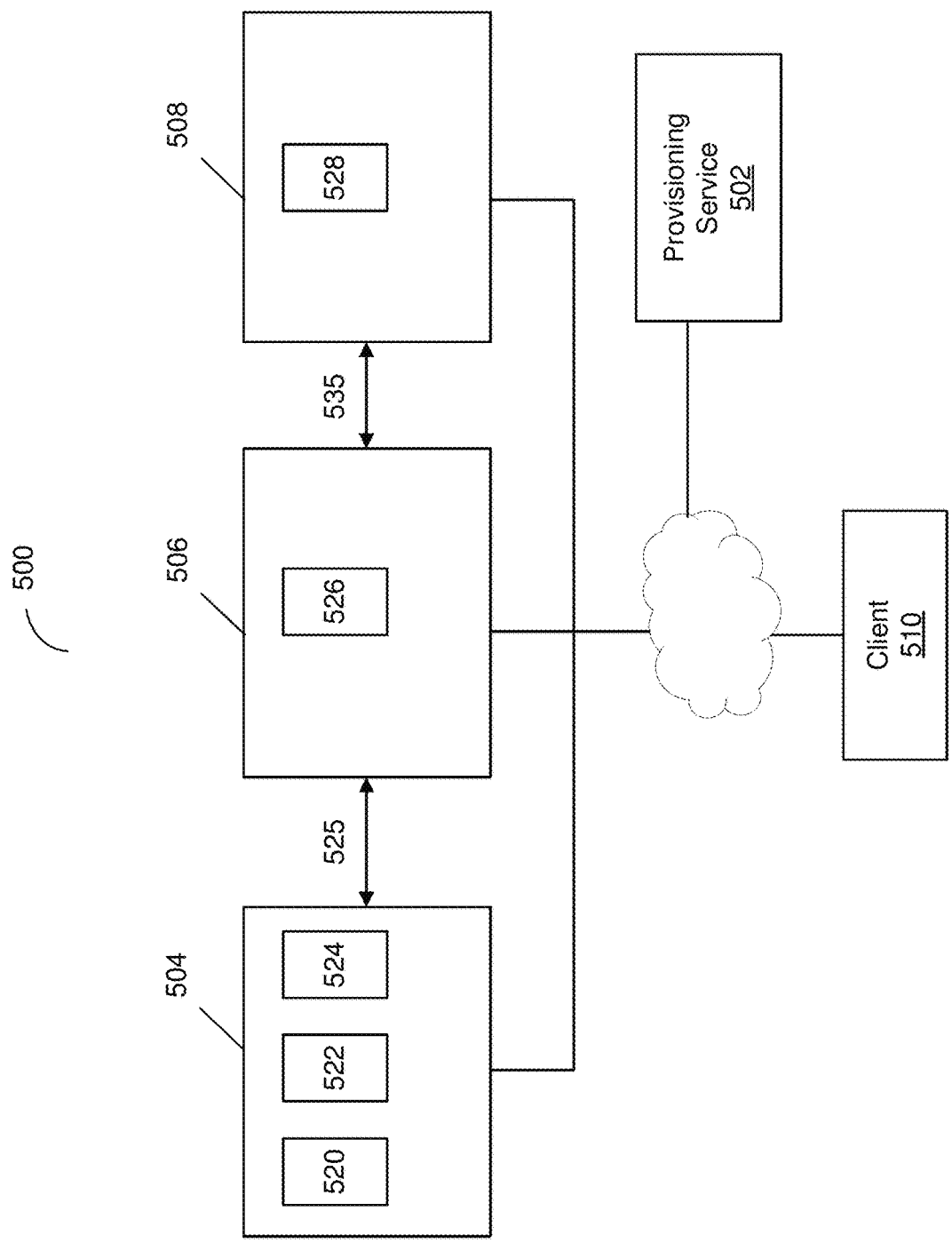
FIG. 5 is a block diagram of an example distributed database system, according to some embodiments of the technology described herein.

In some embodiments, the provisioning service can be configured to enable cross-cloud configuration options to specify the manner in which the clusters/replica set members are to be deployed across multiple cloud providers and/or geographical regions. FIG. 5 is a block diagram of a cloud-based system 500 including a provisioning component, such as, provisioning service 502 and cloud provider systems 504, 506, 508. A client system or end user 510 can access provisioning service 502 to create a distributed database across multiple cloud providers systems 504, 506, 508, via network 520. Cloud provider systems and cloud providers may be used interchangeably herein. In some embodiments, each of the cloud providers 504, 506, 508 may be a different cloud provider such as, AWS of AMAZON, AZURE Cloud, GOOGLE Cloud, and/or any other cloud provider. It will be appreciated that although one client/end user 510 is depicted in FIG. 5, system 500 may support and include multiple clients/end users.

According to one aspect, system 500 can provide a number of user interfaces or web-based platforms on which to access the system. A user can access platform and/or interfaces and define database configurations desired (e.g., size of node, storage, number of replicas, shard (y/n)), for example through the provisioning service (e.g., 502) and associated web site. Based on the user specifications, system 500 may enable creation, access and use of distributed database deployed across cloud providers 504, 506, 508.

System 500 can include a number of application programming interfaces configured to connect with cloud providers 504, 506, 508, define database configurations, provision cloud resources (e.g., networking and/or machine resources) to support the database configurations, establish default security configurations (e.g., VPC (virtual private cloud), TLS (transport layer security), and/or other data encryption, etc.), manage and apply networking rules and/or mapping to facilitate communication between cloud providers 504, 506, 508, capture database applications or settings from existing systems, and identify and execute updates and/or specific versions (e.g., associated with MONGODB™ binaries), among other options.

In one implementation, an end user may, via a graphical user interface (e.g., interfaces 600, 610, 700, 800, 810, 820, 830, 920, 930, 940, 1000, 1010), make a selection to deploy the clusters across multiple cloud providers. In some embodiments, the system 500 may provide an API to allow users to create, modify, delete, and/or otherwise configure the clusters. In some embodiments, the system 500 may allow the user to create a new cluster or reconfigure an existing cluster to span multiple cloud providers. When a user adds additional regions to the cluster via user interface and/or public API, the system 500 provides the user with options to specify which cloud provider and which geographic region the corresponding new nodes are to be allocated. With a cross-cloud cluster configuration, data can be replicated across regions in multiple cloud providers for latency or availability purposes. Clusters may also be deployed across different cloud providers in the same geographical region for high-availability and data-redundancy, for example, within a particular country.

Figure 6A:
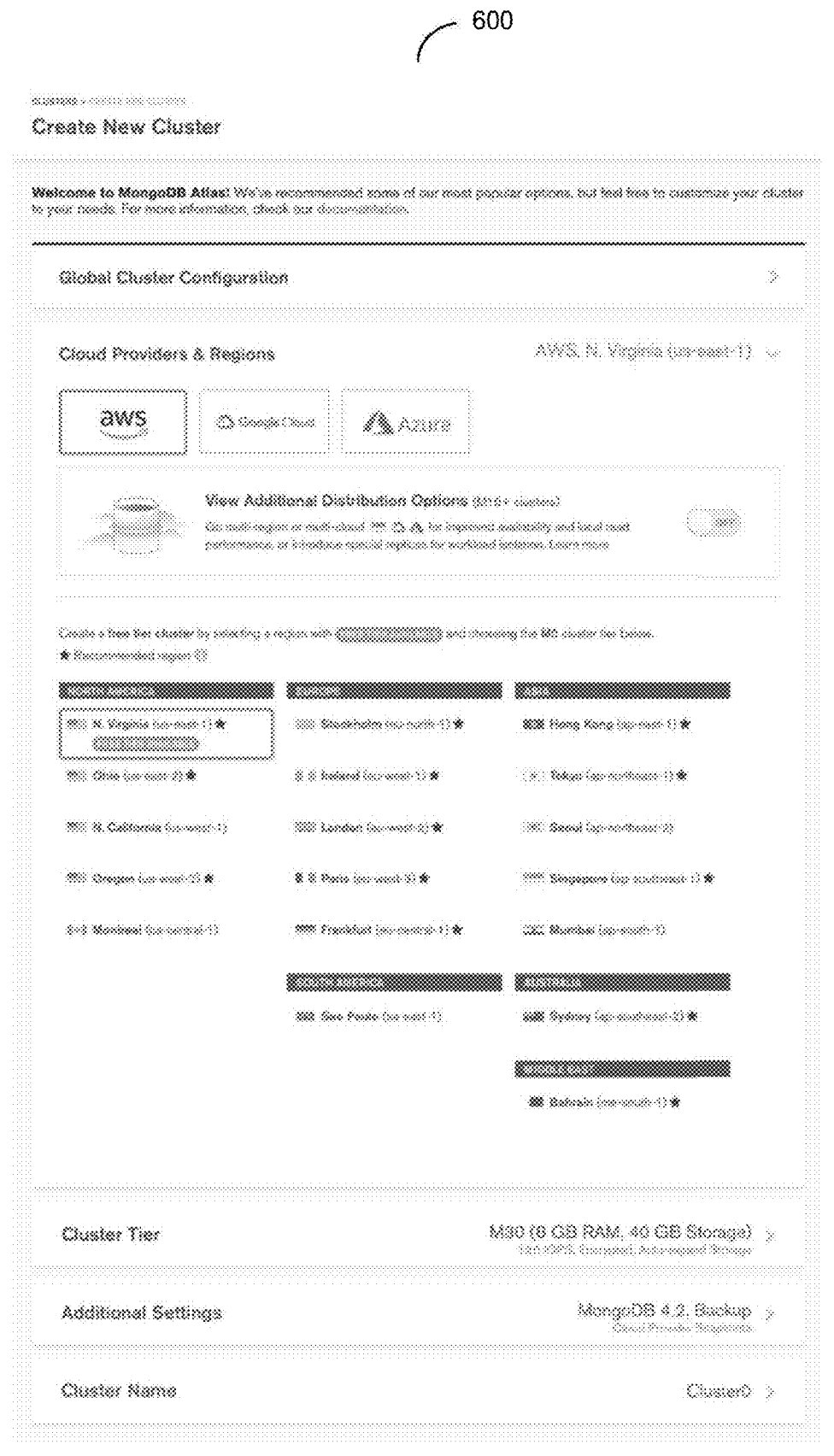
Figure 6B:
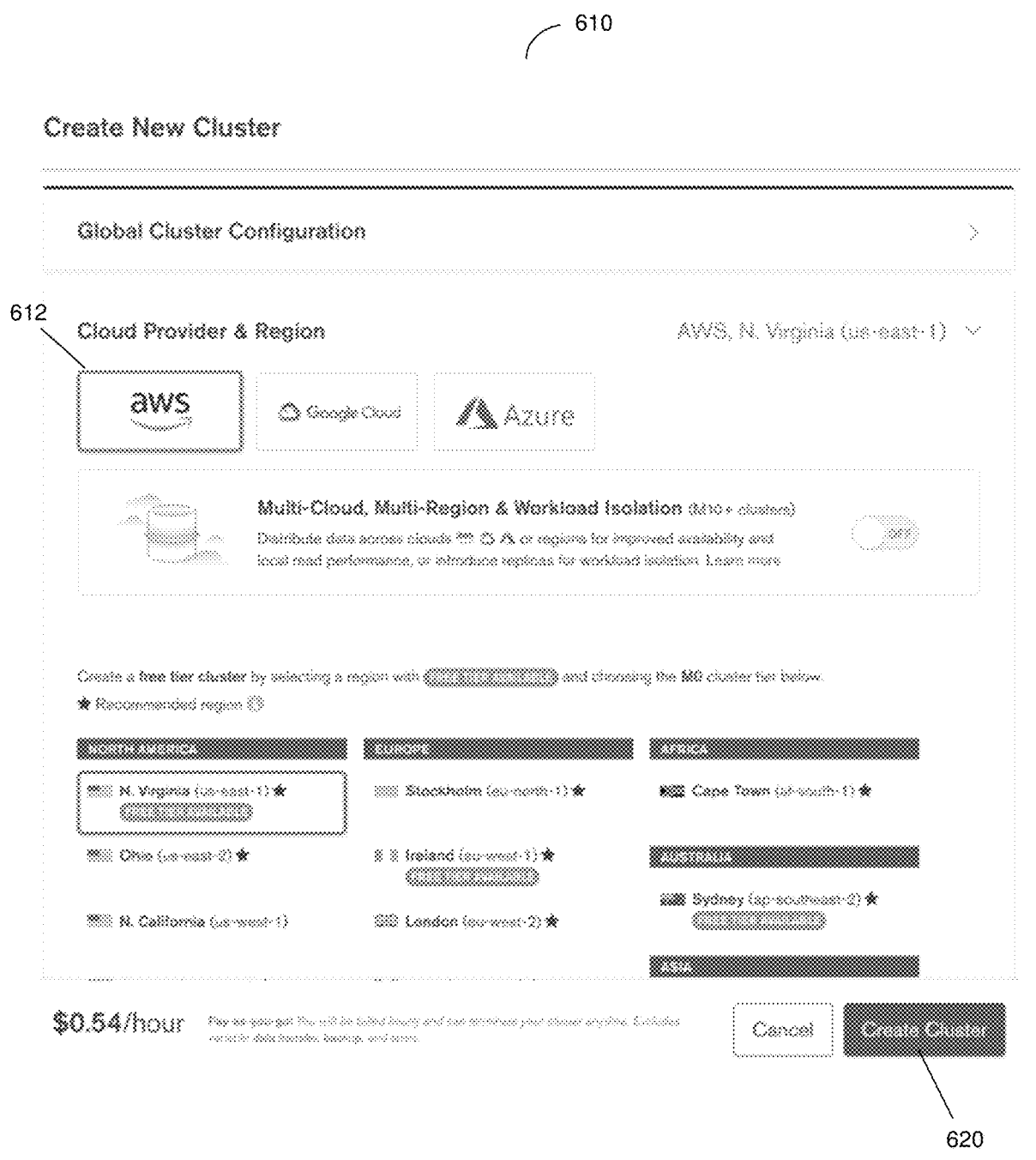

FIGS. 6A and 6B illustrate user interfaces 600, 610 via which a user requests creation of a cluster in the AWS cloud provider 612. In response to user selection of interface element 620 "Create Cluster", the provisioning service 502 may initiate creation of the cluster in the AWS cloud provider.

Figure 10A:
Figure 10B:
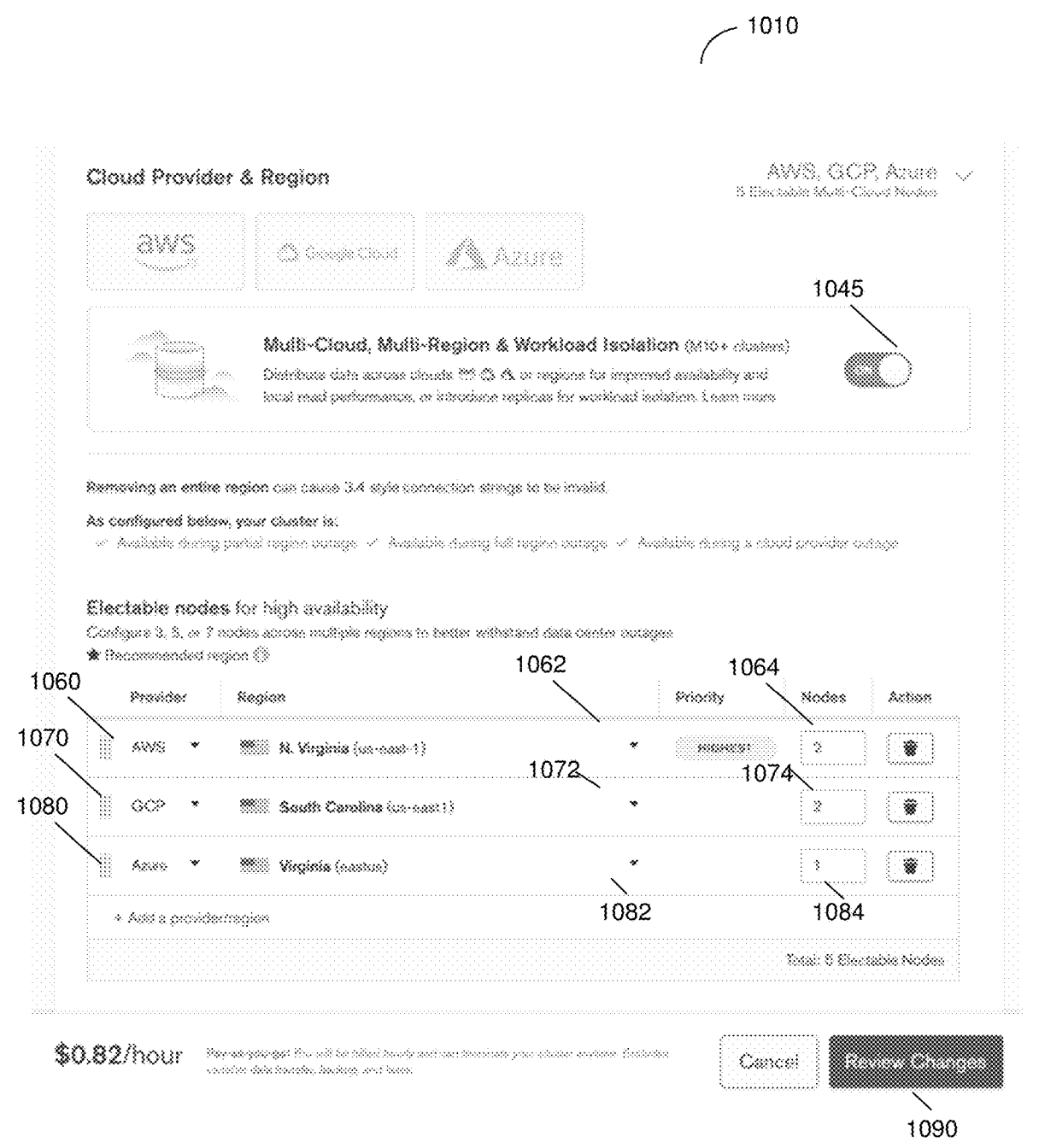

FIGS. 10A-10C illustrate user interfaces 1000, 1010, 1020 via which the user requests reconfiguration of an existing cluster created in the AWS cloud provider 1040. For example, the user may have previously created a cluster in the AWS cloud provider via user interface 1000. The user may then reconfigure the cluster to span multiple cloud providers via user interface 1010 of FIG. 10B. As shown in FIG. 10B, a user may indicate, via an interface element 1045 (e.g., toggle), that a cross-cloud or multi-cloud configuration is enabled. Interface elements 1060, 1070, 1080 may be provided to allow selection of different cloud providers for deploying nodes of the cluster. Additional interface elements 1062, 1064, 1072, 1074, 1082, 1084 may be provided to allow selection of respective regions and nodes for each cloud provider. In some embodiments, in response to a selection of interface element 1090, user interface 1020 of FIG. 10C may be generated and presented. User interface 1020 shows the changes between the original configuration and the new configuration. In response to selection of interface element 1092, the system 500 may apply the selected changes and create a cluster with the new configuration.

Figure 7:
FIG. 7 is an example screen capture of a user interface for a cross-cloud deployment, according to some embodiments of the technology described herein.
Figure 8A:
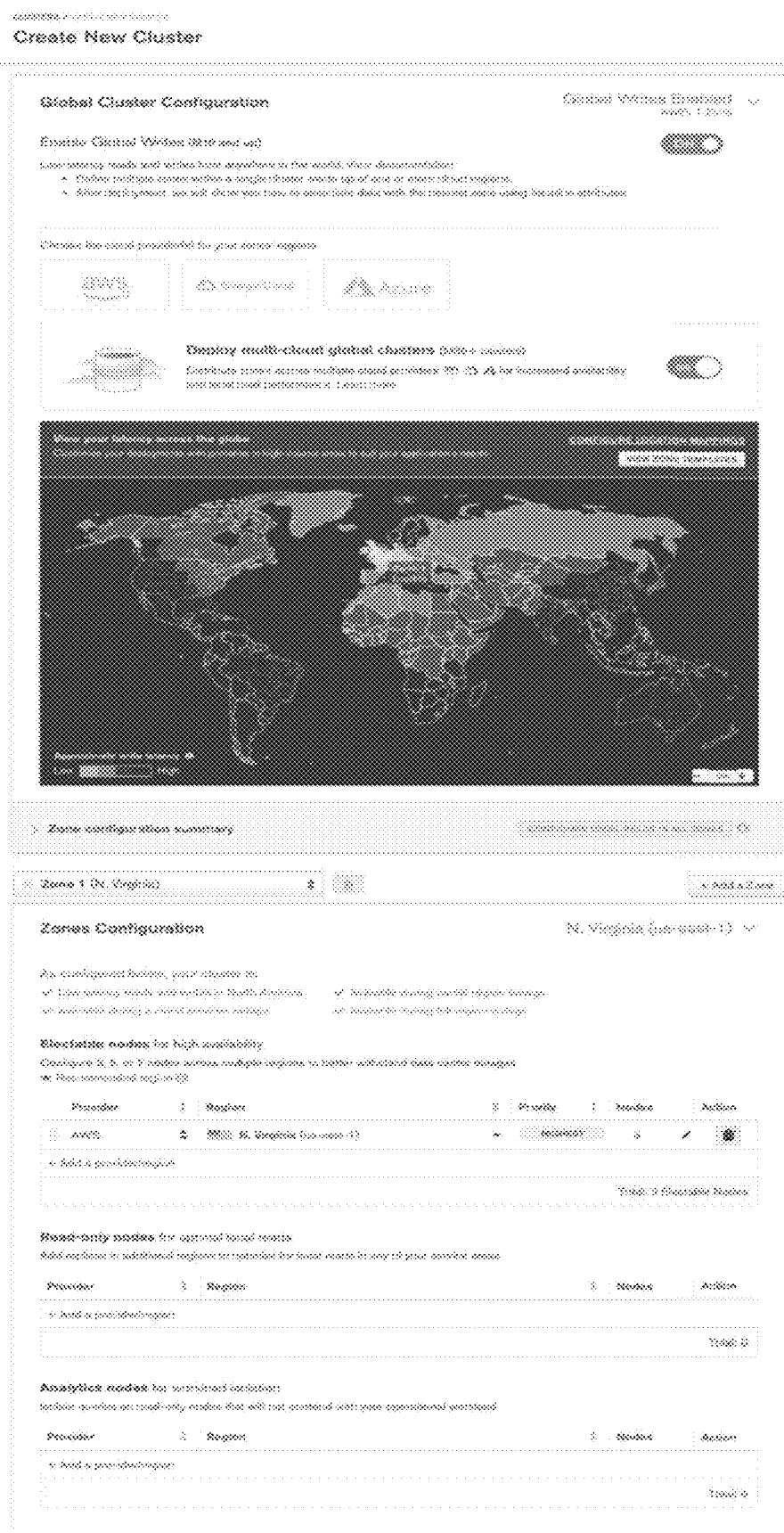
Figure 8B:
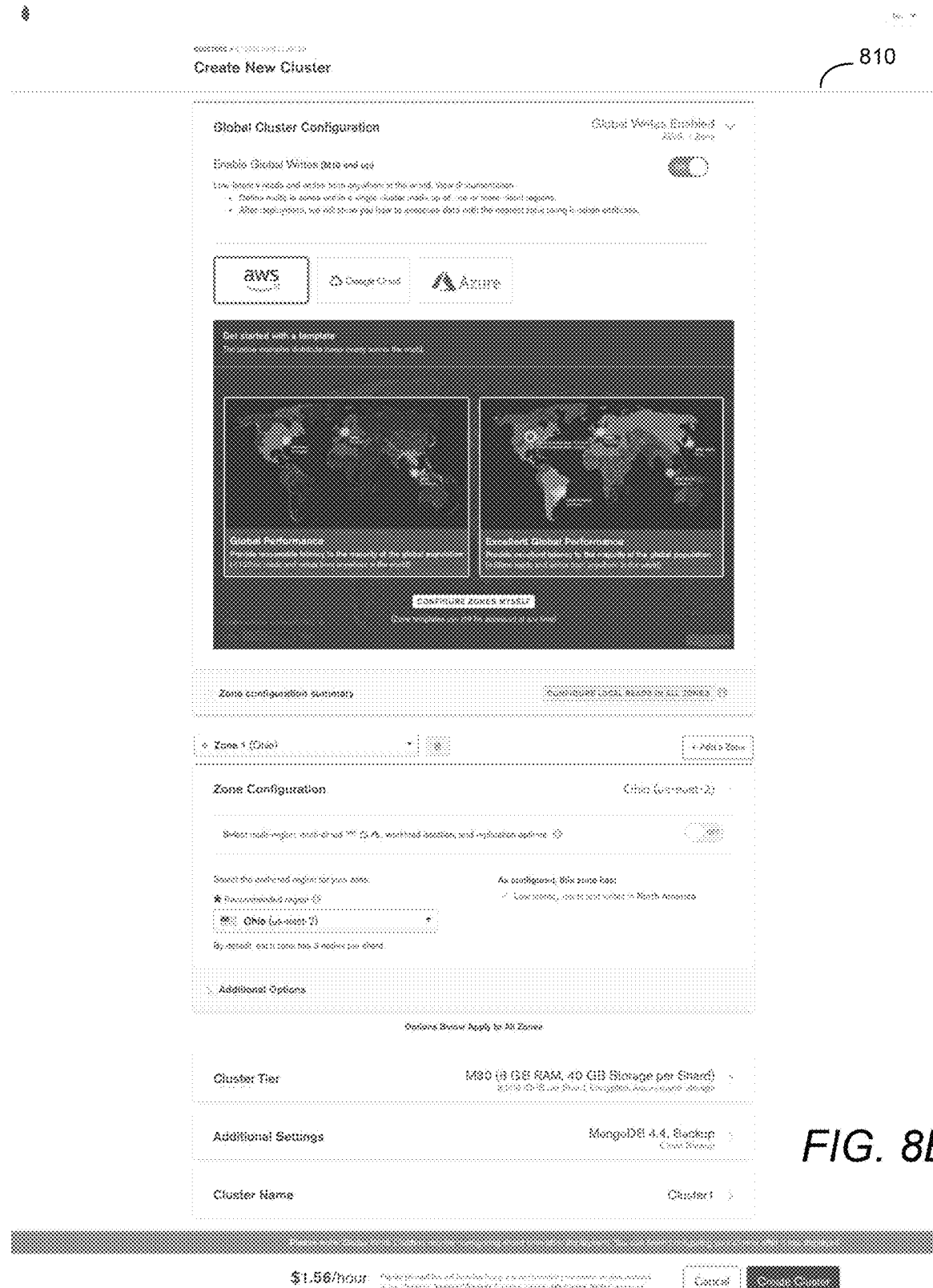
Figure 8D:
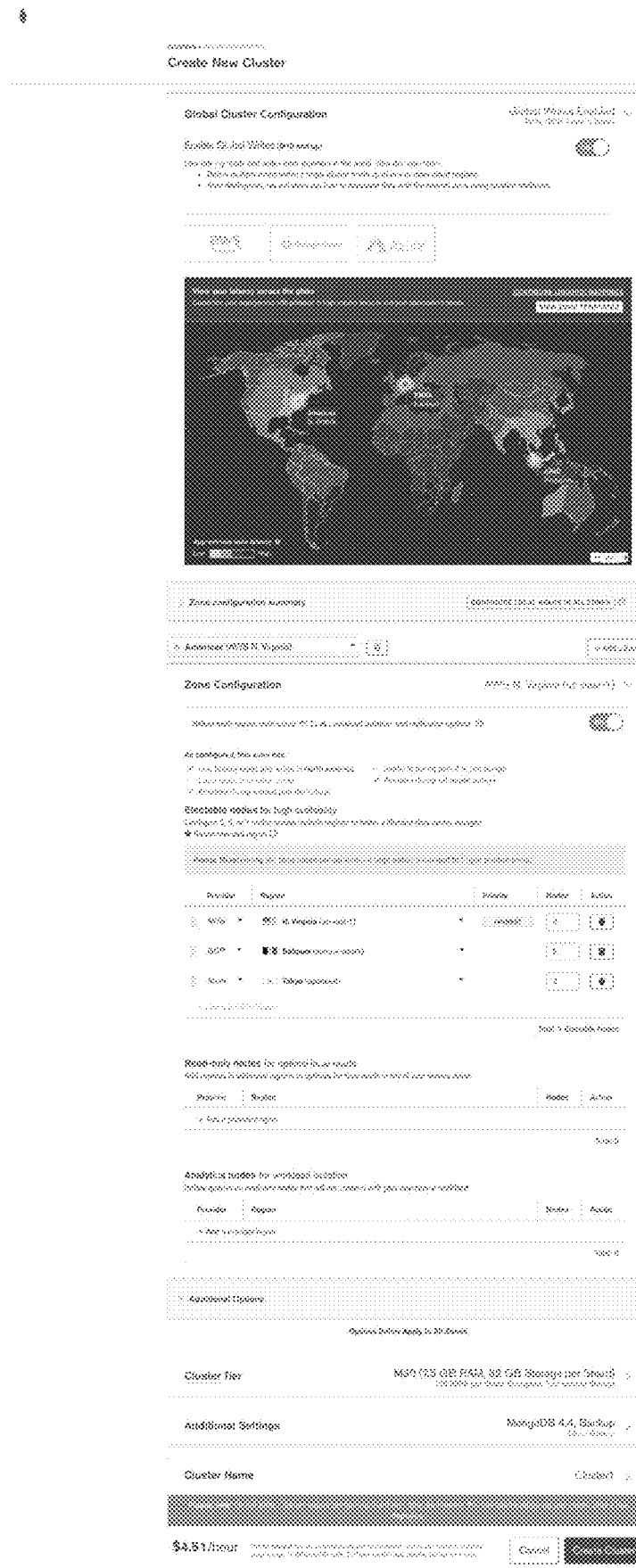
Figure 9A:
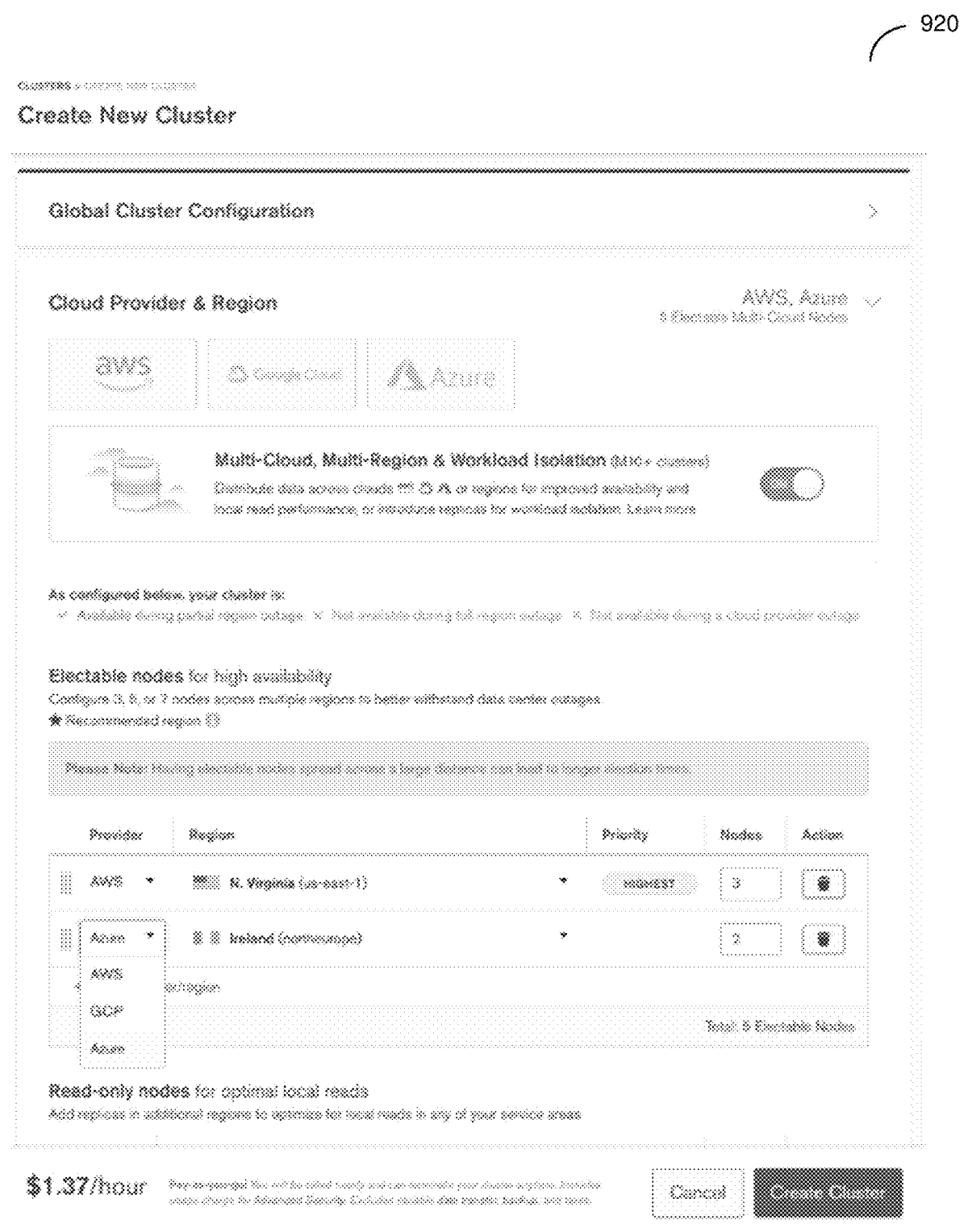
Figure 9B:
Figure 9C:
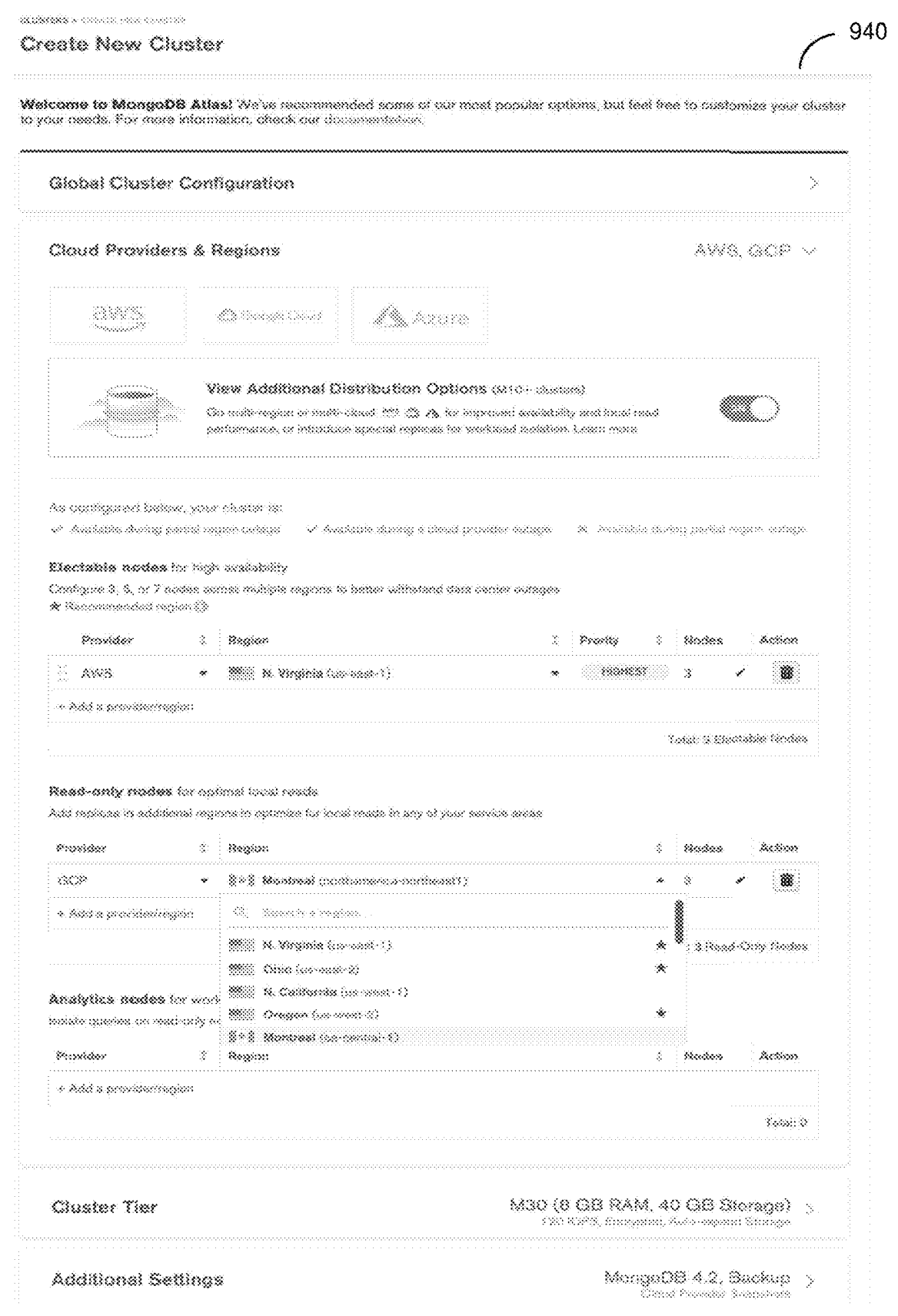

In some embodiments, cross-cloud deployments retain the same level of flexibility as the cross-region deployments. For example, a number of election-participating nodes or electable nodes may be configured in each individual region. In some embodiments, a primary node is elected from among the electable nodes. Priority of individual regions may be specified to ensure that nodes from high priority regions are prioritized during the election process. Analytics or Read Only nodes may be provisioned in any combination of regions and cloud providers. Analytics nodes are similar to read-only nodes but are provided for workload isolation, where analytics based workload is isolated to these nodes without impacting operational performance. Cloud provider snapshot backups are provided for backup needs, and snapshots can be taken in the highest priority region. For example, FIG. 7 illustrates user interface 700 via which a user may request creation of a cluster which includes a number of selected electable nodes in a particular region 710 of the AWS cloud provider 702 and a number of selected read-only nodes in a particular region 712 of the GCP cloud provider 704. FIGS. 9A, 9B, 9C illustrate additional example user interfaces 920, 930, 940 via which a user may request creation of clusters by specifying configurations for cloud providers, regions, electable nodes, read-only nodes, analytics nodes, and/or other configurations.

According to some aspects, provisioning service 502 can be configured to enable cross-cloud configuration options for global clusters. Global clusters allow replica sets to be provisioned or deployed in different geographical regions called zones. For example, a zone may be configured to contain a three node replica set distributed across availability zones of its preferred cloud region. In some embodiments, a global cluster may be provisioned with multiple providers across different zones. Zones can be configured to contain a mix of cloud providers or a particular zone can be replicated across multiple cloud providers. Such configurations allow placement and distribution of data to be managed in compliance with the strictest policies and data redundancy requirements while minimizing read latency (e.g., by keeping the data close to the requesting end users/clients). For example, FIGS. 8A, 8B, 8C, 8D illustrate user interfaces 800, 810, 820, 830 via which a user may request creation of global clusters by specifying configurations for zones, cloud providers, regions, electable nodes, read-only nodes, analytics nodes, and/or other configurations.

FIG. 5 illustrates an example cross-cloud deployment where a five-node cluster/replica set is deployed across three different cloud providers—three nodes 520, 522, 524 are deployed in a first cloud provider 504, one node 526 is deployed in a second cloud provider 506, and one node 528 is deployed in a third cloud provider 508. Any number of cloud compute resources (e.g., virtual machines or servers) may be assigned or used to execute the respective nodes in each cloud provider. Each cloud provider may include its own networking components or rules that enable communication and/or data transfer to/from the respective nodes of the cloud provider. The cloud compute resources and/or other components (e.g., other servers) of each cloud provider may manage data transfer (e.g., reads, writes, queries, etc.) to/from the respective nodes of the cloud provider. Although FIG. 5 illustrates a cross-cloud deployment for a distributed database supported by a replica set model with a replication factor of 5, other configurations may be used, such as models with replication factor 3, 7, or any other replication factor. Patent application Ser. No. 15/074,987, entitled, METHOD AND APPARATUS FOR MAINTAINING REPLICA SETS, filed on Mar. 18, 2016 describes example of replica set and replica set models and is incorporated herein by reference in its entirety.

In some embodiments, in response to a request via client 510 (e.g., via the user interfaces described herein, such as selection of "Create Cluster" interface element or "Apply Changes" interface element), provisioning service 502 can be configured to generate an instantiation of a distributed database on multiple cloud providers 504, 506, 508. Provisioning service 502 may communicate and/or coordinate with components of cloud providers 504, 506, 508 to generate the instantiation of the distributed database. Instantiation of the distributed database may include allocation of the five-node replica set 520, 522, 524, 526, 528 for database operations. Once instantiated, client 510 may connect to nodes deployed across different cloud providers 504, 506, 508 to perform database operations (e.g., reads, writes, and/or other operations). Patent application Ser. No. 15/627,613 entitled "SYSTEMS AND METHODS FOR MANAGING DISTRIBUTED DATABASE DEPLOYMENTS," filed on Jun. 20, 2017, describes instantiation/deployment of a distributed database on a single cloud provider via a proxy layer executed on the cloud provider. Such a proxy layer may be provided on each of the cloud providers 504, 506, 508 to enable communication and/or database operations with respective nodes of the cloud provider.

In some embodiments, indirection layers managed by provisioning service 502 are used to bridge connections between multiple cloud providers. The indirection layer(s) may include a control plane that implements network mappings that allow nodes associated with one cloud provider and/or region to communicate with nodes of another cloud provider and/or region. In some implementations, Public IP Whitelisting may be used when connecting from one cloud provider to another cloud provider. In other implementations, a peered connection (e.g., VPC peering or VNet (Virtual Network) peering) may be used to communicate with nodes in a single cloud provider. End clients may be able to connect to a subset of their topology over the peered connection.

According to some aspects, the provisioning service 502 provides intuitive interfaces (e.g., FIGS. 10A, 10B, 10C) for architecting and updating cross-cloud configurations as and when needed. For example, a new cloud provider can be added to a cluster or migrated from one cloud provider to another without downtime or any change to application code. As shown in FIG. 10C, for example, in response to a user selection of interface element 1092, provisioning service 502 may generate an instantiation of the distributed database that spans multiple cloud providers (e.g., AWS, Azure, GCP). According to some aspects, instantiation of the distributed database that spans multiple cloud providers may include creation of networking containers for each of the cloud providers and creation of machines (e.g., virtual machines) on which the distributed database (e.g., MONGODB™ database) would execute. In the example of FIG. 10C, network containers and machines for Azure and GCP may be created because the corresponding components for AWS already exist. Each networking container specifies a network configuration for the respective cloud provider and includes networking resources or components that enable communication and/or data transfer to/from the respective cloud provider. One or more machines may be created to execute the respective number of nodes in each cloud provider. A cloud provider may assign an IP address to a machine created for the cloud provider.

In some embodiments, provisioning service 502 may manage and apply networking rules and/or mapping to facilitate communication between cloud providers 504, 506, 508. When creating networking containers for each cloud provider, provisioning service 502 may ensure that networking rules and/or mappings are appropriately applied between the networking containers to avoid conflicting network configurations in the cross-cloud deployment. The networking rules manage access, communication, and/or data transfer to/from the individual cloud providers and between the various cloud providers. The networking rules may include ingress/egress rules that manage communication and/or data transfer between cloud providers. For example, a networking container associated with a cloud provider (e.g., Azure) may include ingress/egress rules that enable communication and/or data transfer to/from nodes of another cloud provider (e.g., AWS, GCP). Provisioning service 502 may perform appropriate checks to ensure that ingress/egress rules are properly configured such that only desired IP ranges and ports are allowed.

In some embodiments, communication and/or data transfer between cloud providers may be managed using IP access lists. Each cloud provider may maintain its own IP access list that enables control of communication/data transfer to/from the cloud provider. In addition, a master IP access list may be maintained that includes an up-to-date listing of IP addresses for all the cloud providers (i.e., a combination IP access list including the IP access list for each cloud provider). In some implementations, the IP access list for each cloud provider may be generated based on IP addresses assigned to the machines created by provisioning service 502 for the respective cloud provider.

According to one aspect, updates or changes to the master IP access list may be monitored to ensure that the updates or changes are propagated to the appropriate cloud provider. For example, if the master IP access list includes entries for three cloud providers (Azure, GCP, AWS), and one or more entries for a first cloud provider are updated, the system may filter the list to ensure that the updated entries are propagated to the other two cloud providers and not the first cloud provider. Ensuring that the IP access lists across the different cloud providers are updated to account for changes allows for seamless communication and/or data transfer between the cloud providers. For example, if a user generates a write request that writes to a primary node of a replica set in a first cloud provider, the networking rules and configurations may be used to transfer (replicate) the data to a secondary node in a different cloud provider. Similarly, if a user generates a read request to read data, the networking rules and configurations may be used to read data from a secondary node in the different cloud provider.

In some embodiments, communication and/or data transfer between the cloud providers may be performed across the Internet but encrypted over the wire with TLS (transport layer security). For example, communication link 525 may enable TLS encrypted communication between cloud providers 504 and 506 and communication link 535 may enable TLS encrypted communication between cloud providers 506 and 508.

According to some aspects, the networking rules may include rule(s) that prevent or disable peering connections between cloud providers. Peering connections may be allowed or enabled for individual cloud providers. Each cloud provider may offer peering that enables a tunnel/bridge to be built between two independent VPCs and allows the tunnel to be traversed in a private connection between networking components for virtual machines in the cloud provider.

The various processes described herein can be configured to be executed on the systems shown and described in the various patent applications incorporated by reference herein. The systems and/or system components can be programmed to execute the processes and/or functions described. Additionally, other computer systems can be specially configured to perform the operations and/or functions described herein. For example, various embodiments according to the present invention may be implemented on one or more computer systems. These computer systems may be, specially configured, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to host a database, a database replica, a database partition, a database shard, a database chunk and perform functions associated replica sets, data partitions, and shards as described in the various patent applications incorporated by reference herein. Further, the computer systems can be configured to execute the processes discussed above for managing a distributed database across multiple cloud provider systems. Additionally, any system may be located on a single computer or may be distributed among a plurality of computers attached by a communications network.

A general-purpose computer system can be specially configured as disclosed herein. According to one embodiment of the invention the general-purpose computer system is configured to perform any of the operations and/or algorithms described herein. The operations and/or algorithms described herein can also be encoded as software executing on hardware that define a processing component, that can define portions of a general-purpose computer, reside on an individual general-purpose computer, and/or reside on multiple general-purpose computers.

Figure 11:
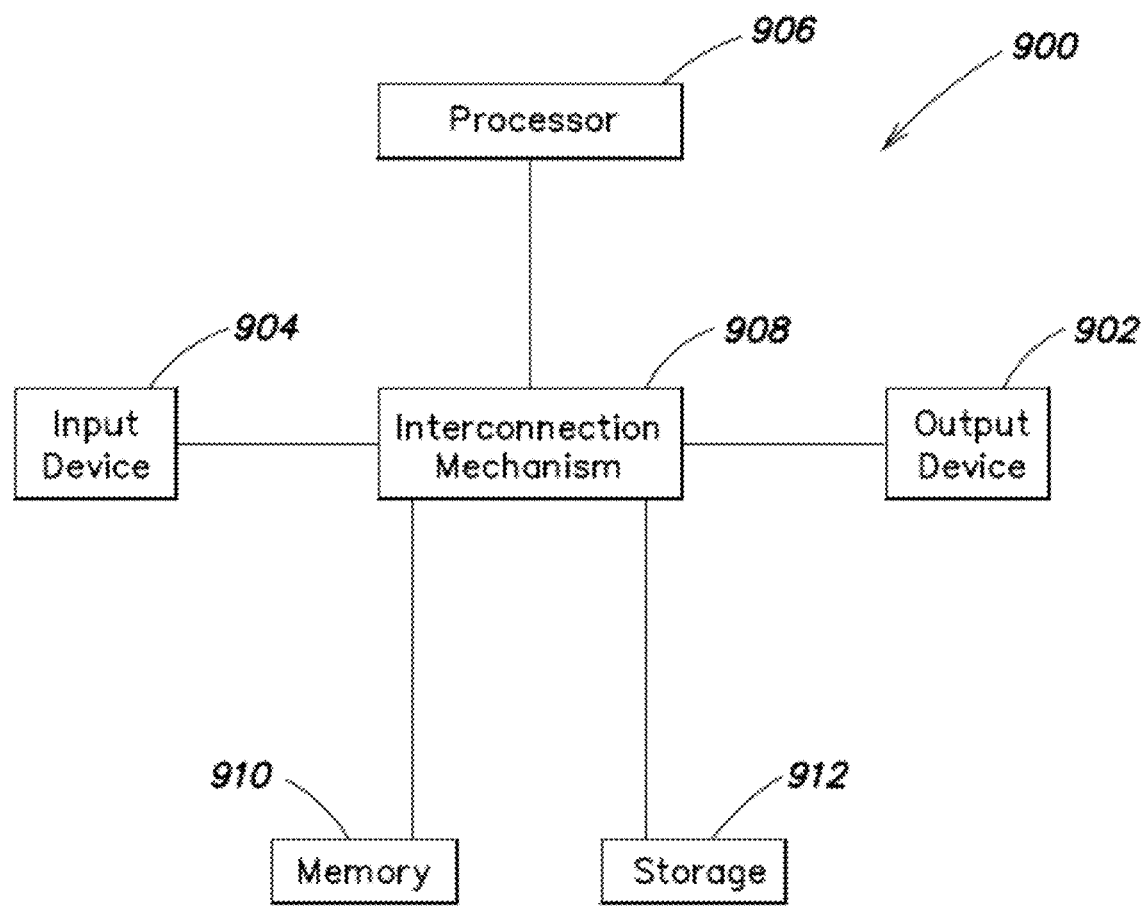
FIG. 11 is a block diagram of an example database system on which various aspects of the technology described herein can be practiced.

FIG. 11 shows a block diagram of an example general-purpose computer system 900 on which various aspects of the present invention can be practiced. For example, various aspects of the invention can be implemented as specialized software executing in one or more computer systems including general-purpose computer systems 1104, 1106, and 1108 communicating over network 1102 shown in FIG. 13. Computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writeable nonvolatile recording medium in which computer executable instructions are stored that define a program to be executed by the processor or information stored on or in the medium to be processed by the program.

Figure 12:
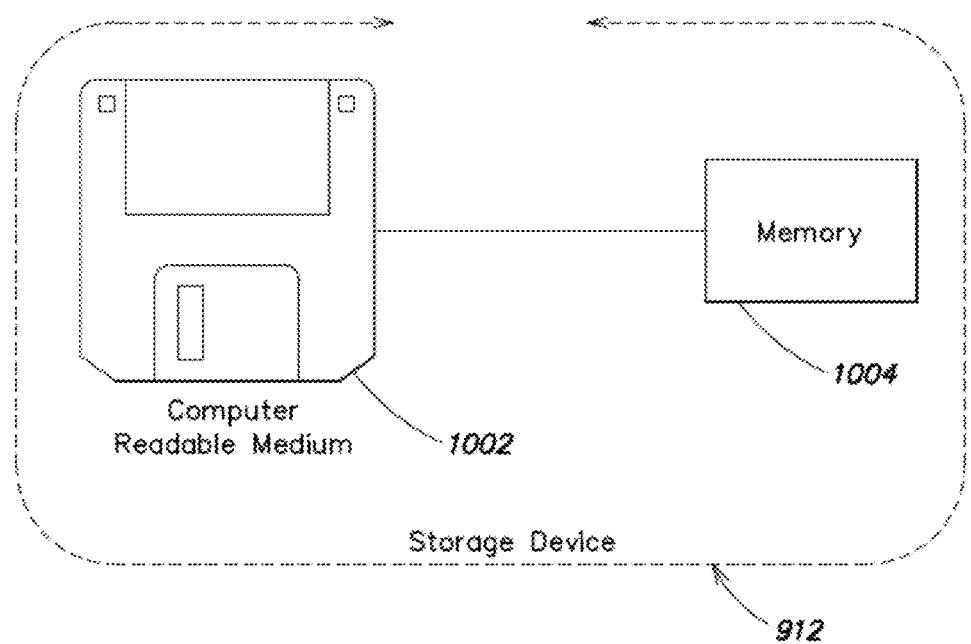
FIG. 12 is a block diagram of an example database system on which various aspects of the technology described herein can be practiced.

The medium can, for example, be a disk 1002 or flash memory as shown in FIG. 12. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 11, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the disclosure are not limited to being implemented on the computer system as shown in FIG. 11. Various aspects of the invention can be practiced on one or more computers having a different architectures or components than that shown in FIG. 11.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C #(C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 900. For instance, the system can be a distributed system (e.g., client server, multi-tier system) comprising multiple general-purpose computer systems. In one example, the system includes software processes executing on a system associated with hosting database services, processing operations received from client computer systems, interfacing with APIs which receive and process client requests, interfacing with driver operations, performing operations associated with various nodes, for example.

The systems can be distributed among a communication system such as the Internet. One such distributed network, as discussed below with respect to FIG. 13, can be used to implement various aspects of the invention.

Figure 13:
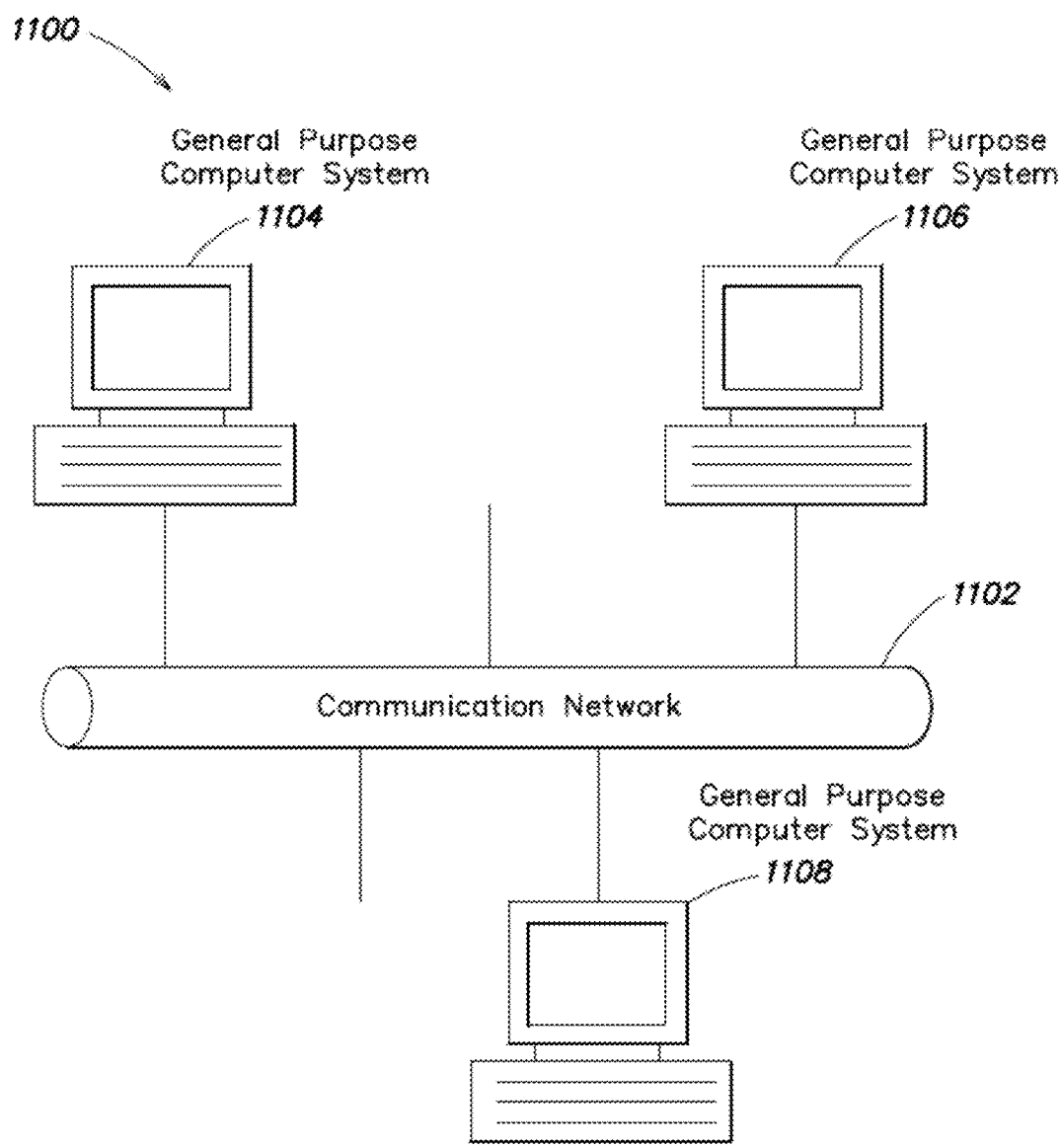
FIG. 13 is a block diagram of an example database system on which various aspects of the technology described herein can be practiced.

FIG. 13 shows an architecture diagram of an example distributed system 1100 suitable for implementing various aspects of the invention. It should be appreciated that FIG. 13 is used for illustration purposes only, and that other architectures can be used to facilitate one or more aspects of the invention.

System 1100 may include one or more specially configured general-purpose computer systems distributed among a network 1102 such as, for example, the Internet. Such systems may cooperate to perform the various functions and processes described herein. In an example of one such system, one or more computer systems 1104, 1106, and 1108 are configured to be nodes in a replica set. The replica set is configured to respond to client requests for database access. In one setting, access to the database occurs through various APIs and associated drivers. In one example, client computer systems can interface with computer systems 1104-1108 via an Internet-based interface.

In another example, a system 1104 can be accessed through a browser program such as the Microsoft Internet Explorer application program, Mozilla's FireFox, or Google's Chrome browser through which one or more websites can be accessed. Further, there can be one or more application programs that are executed on system 1104 that perform functions associated with responding to client interactions. For example, system 1104 may respond to provisioning requests by configuring and deploying various data elements across multiple cloud provider systems as described herein.

Network 1102 may also include, as part of a system for managing a distributed database across multiple cloud provider systems, one or more server systems, which can be implemented on general-purpose computers that cooperate to perform various functions and processed described herein. System 1100 may execute any number of software programs or processes on various hardware and the invention is not limited to any particular type or number of processes. Such processes can perform the various workflows associated with a system for managing read requests.

Certain implementations of database/cloud based systems, can employ any number of the following elements.

Each of the elements can be configured to perform the listed functions individually collectively and in various combination.

In one embodiment, a system can be configured to perform one or more and any combination of the following processes/functions:

Allow users to provision a replica set/sharded cluster (e.g., in MongoDB's Atlas) with electable nodes across N regions in cloud provider X and read-only/analytics nodes across M regions in cloud provider Y For example:
5 nodes replica set
3 electable nodes in AWS US_EAST_1 and US_WEST_1
2 read-only nodes in Azure EUROPE_NORTH and Azure EUROPE_WEST Allow cloud provider selection via the user interface Allow for instance size selection in the user interface that accounts for multiple providers.

In some embodiments, the lowest common denominator set of information available for each instance size may be displayed via the user interface. For example, providing hardware and storage specifications that are common and available across the multiple providers Allow for cloud provider snapshots backups Allow support for various features of Atlas, such as, but not limited to:
MongoDB Stitch and MongoDB Realm
MongoDB Charts
Live Migration
BI Connector
Atlas Online Archive to Atlas Data Lake
Encryption at Rest with customer key management Allow support for SRV records for cross-cloud clusters Allow users to provision cross-cloud configurations based on geographical requirements where data remains within a particular region, but where availability requirements mean spreading across multiple providers in that region makes sense. For example, a preferred region might be Azure UK South, with a secondary region on Azure UK West and third region on GCP UK Allow users to instantiate election-participating and workload specific nodes in regions(s) on different cloud providers Allow users to choose their cross-cloud configuration across multiple providers in a flexible manner (e.g., where its roughly the same throughput on each cloud/lower common denominator between them, etc.)

Allow users to replicate data across regions in multiple cloud providers whether for latency or availability purposes Allow users to order regional priority amongst regions of multiple cloud providers Allow users to target Analytics or Read Only nodes to region(s) on multiple cloud providers, or on different cloud providers from the election-participating nodes Allow users to replicate across multiple cloud providers in a particular country and keep backups in that country Allow users to leverage multiple cloud providers in Zones of a Global Cluster Allow users to connect to their cluster via different connection options such as but not limited to public IP whitelisting, VPC/VNet peering, private endpoints Allow users to migrate from one cloud provider to another seamlessly Peering and private endpoints—When using peering with a cross-cloud/multi-cloud cluster, connections are configured by embodiments to a subset of nodes that match the peering connection's provider. For example, the system can be configured to limit peering and private endpoint to occur intra-cloud and prevent inter cloud peering or private endpoint connections. In further embodiments, the system can manage a connection that is attempted to a cluster over peering which has a primary node in a different cloud provider and enable the connection for secondary reads Publish DNS records and propagate—Remove cloud-provider specific subdomains in the DNS records maintained by the system to enable cross-cloud deployment, e.g., connection strings used to connect to Azure or GCP such as "abc12.azure.cloud.mongodb.com" or "xyz12.gcp.cloud.mongodb.com" may be updated to remove the ".azure" and ".gcp" subdomain Allow encryption of data in a cross-cloud deployment—each cloud provider offers a key management service (e.g., AWS KMS, Azure KeyVault, and GCP KMS)—using an abstraction layer, a master key may be fetched from each individual cloud providers' key management service. Multiple secondary keys may be derived from the master keys and the secondary keys may be used to encrypt data. The benefit of using the abstraction layer is that there is no reliance on the cloud provider of the key management solution to be the same cloud provider as the underlying node that bears data.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for managing a distributed database across multiple cloud provider systems, the system comprising:
at least one processor operatively connected to a memory; and
a provisioning component, executed by the at least one processor, configured to accept user specification of configuration for the distributed database across the multiple cloud provider systems, wherein the provisioning component is further configured to:
receive, via a user interface, a selection of hardware and storage specifications that are common and available across the multiple cloud provider systems; and
configure the distributed database across the multiple cloud provider systems based on the user specification at least in part by configuring a replica set including electable nodes and read-only nodes across the multiple cloud provider systems.

2. The system of claim 1, wherein the electable nodes are deployed across one or more geographical regions associated with one or more cloud provider systems and the read-only nodes are deployed across one or more geographic regions associated with the one or more cloud provider systems.

3. The system of claim 1, wherein configuring the replica set across the multiple cloud provider systems further comprises:
deploying at least one electable node at a first cloud provider system;
deploying at least one read-only node at a second cloud provider system different from the first cloud provider system; and
deploying at least one analytics node provided for workload isolation at a third cloud provider system different from the first cloud provider system and the second cloud provider system.

4. The system of claim 3, wherein configuring the replica set across the multiple cloud provider systems further comprises:
deploying a first electable node at the first cloud provider system; and
deploying a second electable node at a fourth cloud provider system different from the first cloud provider system.

5. The system of claim 1, wherein configuring the replica set across the multiple cloud provider systems comprises:
configuring the replica set across a first set of cloud provider systems; and
reconfiguring the replica set across a second set of cloud provider systems different from the first set of cloud provider systems.

6. The system of claim 1, wherein configuring the replica set across the multiple cloud provider systems comprises:
managing networking rules that enable communication and/or data transfer between the multiple cloud provider systems.

7. The system of claim 6, wherein the networking rules include at least one rule that prevents peering connections between the multiple cloud provider systems.

8. The system of claim 1, wherein configuring the replica set across the multiple cloud provider systems comprises:
managing communication and/or data transfer between the multiple cloud provider systems using IP access lists, wherein an IP access list for each cloud provider system includes one or more IP addresses assigned to one or more virtual machines created for the respective cloud provider system.

9. The system of claim 8, wherein managing communication and/or data transfer between the multiple cloud provider systems using IP access lists comprises:
monitoring updates or changes to a master IP access list; and
propagating the updates or changes to at least one IP access list associated with at least one of the multiple cloud provider systems.

10. The system of claim 1, further comprising:
a communication link between a first cloud provider system and a second cloud provider system of the multiple cloud provider systems, wherein data communication via the communication link is encrypted with TLS (transport layer security).

11. A method for managing a distributed database across multiple cloud provider systems, the method comprising:
using at least one computer hardware processor to perform:
receiving a user specification of configuration for the distributed database across the multiple cloud provider systems, wherein receiving the user specification comprises:
receiving, via a user interface, a selection of hardware and storage specifications that are common and available across the multiple cloud provider systems; and
configuring the distributed database across the multiple cloud provider systems based on the user specification at least in part by configuring a replica set including electable nodes and read-only nodes across the multiple cloud provider systems.

12. The method of claim 11, further comprising:
generating an instantiation of the distributed database on the multiple cloud provider systems, wherein the instantiation of the distributed database includes an allocation of the replica set for database operations.

13. The method of claim 11, wherein configuring the replica set across the multiple cloud provider systems further comprises:
deploying at least one electable node at a first cloud provider system;
deploying at least one read-only node at a second cloud provider system different from the first cloud provider system; and
deploying at least one analytics node provided for workload isolation at a third cloud provider system different from the first cloud provider system and the second cloud provider system.

14. The method of claim 11, wherein configuring the replica set across the multiple cloud provider systems comprises:
configuring the replica set across a first set of cloud provider systems; and
reconfiguring the replica set across a second set of cloud provider systems different from the first set of cloud provider systems.

15. The method of claim 11, wherein configuring the replica set across the multiple cloud provider systems comprises:
managing networking rules that enable communication and/or data transfer between the multiple cloud provider systems.

16. The method of claim 15, wherein the networking rules include at least one rule that prevents peering connections between the multiple cloud provider systems.

17. The method of claim 11, wherein configuring the replica set across the multiple cloud provider systems comprises:
managing communication and/or data transfer between the multiple cloud provider systems using IP access lists.

18. The method of claim 17, wherein an IP access list for each cloud provider system includes one or more IP addresses assigned to one or more virtual machines created for the respective cloud provider system.

19. The method of claim 17, wherein managing communication and/or data transfer between the multiple cloud provider systems using IP access lists comprises:
monitoring updates or changes to a master IP access list; and
propagating the updates or changes to at least one IP access list associated with at least one of the multiple cloud provider systems.

20. At least one non-transitory computer readable storage medium storing processor-executable instructions that, when executed by at least one hardware processor, cause the at least one hardware processor to perform a method for managing a distributed database across multiple cloud provider systems, the method comprising:

receiving a user specification of configuration for the distributed database across the multiple cloud provider systems, wherein receiving the user specification comprises:

receiving, via a user interface, a selection of hardware and storage specifications that are common and available across the multiple cloud provider systems; and configuring the distributed database across the multiple cloud provider systems based on the user specification at least in part by configuring a replica set including electable nodes and read-only nodes across the multiple cloud provider systems.

* * * * *